UNITED STATES PATENT OFFICE.

ALBERT A. DENTON, OF BAVARIA, KANSAS.

PROCESS OF MAKING SUGAR.

SPECIFICATION forming part of Letters Patent No. 309,776, dated December 23, 1884.

Application filed May 6, 1884. (No specimens.)

*To all whom it may concern:*

Be it known that I, ALBERT A. DENTON, a citizen of the United States, residing at Bavaria, in the county of Saline and State of Kansas, have invented certain new and useful Improvements in Process of Making Sugar, of which the following is a specification, reference being had therein to the accompanying drawings.

One of the objects of my invention is to reduce the time which is now necessary in defecating cane-juice or other natural saccharine liquids before the liquor enters the finishing or final evaporating apparatus. As now ordinarily practiced, these saccharine liquids are first treated with chemicals, or are not so treated. The liquid is then heated to nearly the boiling-point, when the heat coagulates a part of the vegetable impurities or albuminous substances in the liquid, which ascend to the surface as scum or deposit as sediment. The density of the liquid is now less than it was before heat was applied, because a part of the solid substances in solution have been removed from the liquid, leaving a larger proportion of water. The liquid is then drawn off, freed from a portion of its impurities, and is then boiled. As the evaporation progresses, the density of the liquid increases, because water is removed in the form of steam, leaving the solid substances in solution. As the density of the liquid increases, its boiling-point rises—that is, the liquid gets hotter—until the heat is sufficient to coagulate another portion of the impurities, which are removed by skimming, and this process is continued until the density of the liquid is sufficiently great, and the heat is consequently sufficiently high, to coagulate the greater part of the vegetable or albuminous impurities, which are removed as fast as formed by skimming, and sometimes also by settling-tanks. The clarified liquid is then transferred to the finishing or final-evaporating apparatus. This process has objections—namely, the liquid is exposed to high heat for a long time, and this has a destructive effect on the saccharine substances. The defecation is also a continuous process, performed by a heat which gradually increases as the evaporation progresses, and as skimming or removal of the impurities is impossible in a vacuum-pan or other apparatus for evaporating at low temperatures, and as low temperatures will not coagulate the impurities, the greater part of the evaporation is necessarily performed at high temperatures and by long-continued heat, in order to properly defecate the liquid. Another objection is that quick evaporation, which means violent ebullition, is, in saccharine liquids, essential to good product; but in rapid ebullition much of the scum is "boiled in" or reincorporated with the liquid, and cannot then be afterward removed, and much of the sediment is also boiled in, for it cannot settle while the liquid is rapidly boiling, and the removal of the impurities from the liquid is thus necessarily imperfect.

One object of my invention is to increase the density of the liquid at once to any desired degree, and I accomplish this by adding cane to the cane-juice, maple-sap, or other saccharine liquid. Heat is then quickly applied to the liquid until it nearly reaches its boiling-point, which is now higher, because the density of the liquid is greater. The heat is then shut off. The liquid is now as dense—that is to say, it is as hot—as it would have been if it had been boiled in the ordinary way until it had reached the same density, and this degree of heat coagulates the impurities at once, and as perfectly as continuous heat, and the impurities are not boiled in, because the liquid has not been in a state of ebullition, which necessarily reincorporates some of the impurities. The liquid has only been exposed to high heat for a few moments, which is sufficient to coagulate the impurities, instead of being exposed to high heat for a long time, as is the case where the clarification and the evaporation of the liquid are performed together by the ordinary continuous process.

It is known that a dilute solution of albumen requires a higher temperature to coagulate the albumen than a dense solution of albumen, for a dense solution coagulates much below the boiling-point of water, while a dilute solution requires a much higher temperature. Adding cane-sugar to cane-juice, maple-sap, or other natural saccharine liquids absorbs the water, and thus increases the density of the albuminous solutions in the liquid, and thus assists in defecation. The clarified liquid is then drawn off below the scum on the surface and above the sediment on the bottom into a vacuum-pan or into my apparatus for evaporating liquids by air, the application for a patent on which is now pending, and the entire process of evaporation is performed at comparatively low temperatures. When the proper density is attained, crystallization takes place, and the sugar which was added to the saccharine liquid is regained and the sugar which was originally contained in the liquid is also obtained with it. As much as is necessary of the sugar thus obtained is added to a successive quantity of the saccharine liquid, which is operated on, and the above described process is repeated.

It is evident that the density of the liquid can be increased by the addition of other soluble substances than sugar; but there are difficulties in the way of separating soluble substances, and I prefer to add pure cane-sugar only till the proper density is reached. The cane-sugar may be added in any desired proportion up to completely saturating the liquid, according to the nature of the liquid. A mixture of cane-sugar and corn-sugar or glucose crystallizes with difficulty, if at all, and as some of the sugar which is sold as cane-sugar has been adulterated or mixed with the cheaper corn-sugar such a mixture should be avoided in my process described above. A sirup containing a relatively small proportion of cane-sugar and a larger proportion of uncrystallizable substances—such as inverted sugar, wax, gum, &c.—cannot be crystallized, for the uncrystallizable substances prevent the formation of sugar-crystals. A sirup containing a larger proportion of cane-sugar will sometimes crystallize slightly, and the sirup is then cloudy from the formation of minute sugar-crystals, and a small quantity of small grain and soft sugar sometimes is deposited, after long standing, from such sirups. A sirup containing a large preponderance of cane-sugar and a small proportion of uncrystallizable substances crystallizes freely and quickly, and the sugar-crystals have a larger and sharper grain. Such sirups sometimes crystallize so completely that it is not easy to insert a spade into the mass of crystals. The addition of cane-sugar to cane-juice, its own sugar, maple-sap, or other natural saccharine liquids thus increases the density, raises the boiling-point, coagulates the impurities at once, lessens the time of exposure to high heat, permits all of the evaporation to be performed at low temperatures, obviates the "boiling in" or reincorporation of the impurities, promotes crystallization, and improves the grain of the sugar obtained. If sufficient sugar is added to the saccharine liquid so that the mixture will not readily ferment, and if the mixture is then clarified, the entire process of evaporation may then be performed without any artificial heat by using very large evaporating-surfaces exposed to rapid currents of dry air at ordinary temperatures. If less sugar is added, the temperature should be above the fermenting-point—say 140° Fahrenheit.

I am aware that in refineries the raw sugar which is to be refined is sometimes added to the "sweet waters" or washings of filters, &c. This solution is then clarified, and the sugar which was added to the liquid and that which was in the liquid before are both obtained refined. In this case the raw sugar is not added to this liquid for the purposes named above, but for the purpose of refining the raw sugar, which is best done when in solution, and also as an economy.

I am aware that sugar is added to the juices of fruits in large proportion to absorb their water, and the mixture is clarified by heat, and that jelly, fruit-sirups, &c., are thus formed; but no attempt is made to reduce and crystallize cane-sugar from these solutions, for fruit-juices usually consist, mainly, of other substances than cane-sugar, and the mixed product is usually uncrystallizable.

I am not aware that cane-sugar has ever been added to cane-juice, maple-sap, or other natural saccharine liquids for the purpose of making sugar—that is to say, for the purpose of improving the defecating process and lessening the time now necessary in that process, and for the purpose of allowing the evaporation of the liquid to be entirely performed at low temperatures, and for the purpose of obtaining the sugar originally in the liquid, and also for the purpose of promoting crystallization and improving the grain of the sugar obtained.

It will be evident that the process above described relates to the manufacture of any sugar, and covers the addition of cane-sugar to cane-juice or other natural saccharine liquids which contain cane-sugar, and the addition of maple-sugar to maple-sap, and the addition of fruit-sugar or grape-sugar to fruit-juices or other saccharine liquids which contain mainly grape-sugar and vegetable acids and flavors. In this way the native substance in the liquid can be obtained without mixture with foreign substances, and the liquid can be defecated, evaporated, and crystallized as in the process already described.

I wish to claim as my invention—

1. The process of defecating cane-juice or other natural saccharine liquids, consisting in adding cane-sugar to the saccharine liquid in quantity sufficient to increase its density and elevate its boiling-point at once to the degree which may be necessary to coagulate the impurities, according to the nature of the liquid.

2. The process of defecation, consisting in applying heat quickly to the artificial sirup obtained by adding its own sugar to the saccharine liquid, as described, until said sirup nearly reaches the boiling-point, and then shutting off the heat and allowing the liquid to remain quiet until the coagulated impurities have separated from the liquid, and then drawing off the clear liquid, substantially as described.

3. In sugar-making wherein its own sugar has been added to the saccharine liquid and quickly heated, and the pure liquid drawn away from the scum and impurities, the process of evaporating the liquid so clarified *in vacuo* or by air at a low temperature, substantially as described.

4. In sugar-making wherein its own sugar has been added to the saccharine liquid and quickly heated, and the pure liquid drawn away from the scum and impurities and evaporated, the process of crystallizing the evaporated products and recovering the sugar added as well as the sugar in the liquid, substantially as described.

In testimony whereof I affix my signature in presence of two witnesses.

ALBERT A. DENTON.

Witnesses:
 ENOCH LEWIS,
 ORLO HUBBARD.